UNITED STATES PATENT OFFICE.

EDWARD HARRISON, OF NEW YORK, N. Y., ASSIGNOR TO R. W. W. SIMPSON, OF SAME PLACE.

IMPROVED EXPLOSIVE COMPOSITION.

Specification forming part of Letters Patent No. 41,578, dated February 9, 1864.

*To all whom it may concern:*

Be it known that I, EDWARD HARRISON, of the city, county, and State of New York, have invented a new and Improved Explosive Compound, suitable for the bursting-charges of explosive projectiles for blasting, and for use as gunpowder in ordnance and fire-arms; and I do hereby declare that the following is a full, clear, and exact description of the component parts of and mode of compounding the same.

This compound consists of chlorate of potash, charcoal, prussiate of potash, and starch of flour, with or without cyanuret of zinc. The proportions may be varied to some extent, but I generally use the following proportions, by weight: chlorate of potash, fourteen (14) parts; charcoal, two (2) parts; prussiate of potash, two (2) parts; potato-starch, two (2) parts; cyanuret of zinc, one (1) part. I reduce these separately to fine powder by trituration in a mortar or by other means. When it is not required to grain the compound it is sufficient to mix the ingredients in a dry state; but when the compound is to be grained for use in ordnance and fire-arms, the starch is to be dissolved in a suitable quantity of warm water, the other ingredients added, and the whole mixed well together, after which the mixture is dried and granulated in any suitable manner.

This compound is much stronger than ordinary gunpowder, and, owing to the absence of sulphur, the danger resulting from the use of chlorate of potash in gunpowder—viz., its liability to detonate by friction or percussion—is obviated in a great degree.

The object of the starch or flour is to unite the other ingredients. I prefer to use potato-starch for this purpose, but wheat, corn, or other starch, or wheat or rye flour may be used for this purpose.

The object of the cynauret of zinc is to increase the strength, but this may be omitted.

I do not confine myself to the use of the precise proportions of the several ingredients herein specified; but

What I claim as my invention, and desire to secure by Letters Patent, is—

An explosive compound composed of chlorate of potash, charcoal, prussiate of potash, and starch of flour, with or without cyanuret of zinc, substantially as herein specified.

EDWARD HARRISON.

Witnesses:
M. M. LIVINGSTON,
R. W. WINFIELD SIMPSON.